United States Patent [19]

Ovard et al.

[11] 3,977,431

[45] Aug. 31, 1976

[54] FLOW CONTROL APPARATUS

[75] Inventors: John C. Ovard, Columbia, Md.; Joel I. Reisman, Santa Rosa, Calif.

[73] Assignee: Ecodyne Corporation, Lincolnshire, Ill.

[22] Filed: July 1, 1974

[21] Appl. No.: 484,485

[52] U.S. Cl. ............................. 137/588; 137/589; 261/DIG. 11
[51] Int. Cl.² ..................................... F16K 24/00
[58] Field of Search ...................... 137/587–589, 137/215, 386, 395, 396, 577; 222/64; 261/DIG. 11, 109; 239/99

[56] References Cited
UNITED STATES PATENTS

| | | | |
|---|---|---|---|
| 530,228 | 12/1894 | Keiner | 141/297 |
| 737,941 | 9/1903 | Leithauser | 137/589 |
| 955,553 | 4/1910 | Ritten | 141/297 |
| 1,052,556 | 2/1913 | Bahan | 137/589 |
| 1,527,934 | 2/1925 | Stalder | 141/297 |
| 1,676,986 | 7/1928 | Hilford | 141/300 |
| 1,705,312 | 3/1929 | Rovano | 141/297 |
| 2,584,946 | 2/1952 | Viarengo | 137/588 |
| 3,485,266 | 12/1969 | Sieghartner | 137/588 |
| 3,554,227 | 1/1971 | Yocum | 137/588 |

Primary Examiner—William R. Cline
Assistant Examiner—H. Jay Spiegel
Attorney, Agent, or Firm—Joel E. Siegel

[57] ABSTRACT

A flow control nozzle for directing a liquid through the floor of a liquid containing basin which includes: a substantially vertical tubular portion having a lower end adapted to extend through the floor of the basin; a chamber portion having a bottom surface adapted to communicate with an upper end of the tubular portion, the bottom surface having openings formed therethrough and being positioned a predetermined distance above the floor of said basin so as to permit liquid to pass therethrough into said chamber portion; and an air vent tube having an upper end adapted to communicate with the atmosphere and a lower end adapted to communicate with said tubular portion.

6 Claims, 4 Drawing Figures

Fig. 2.

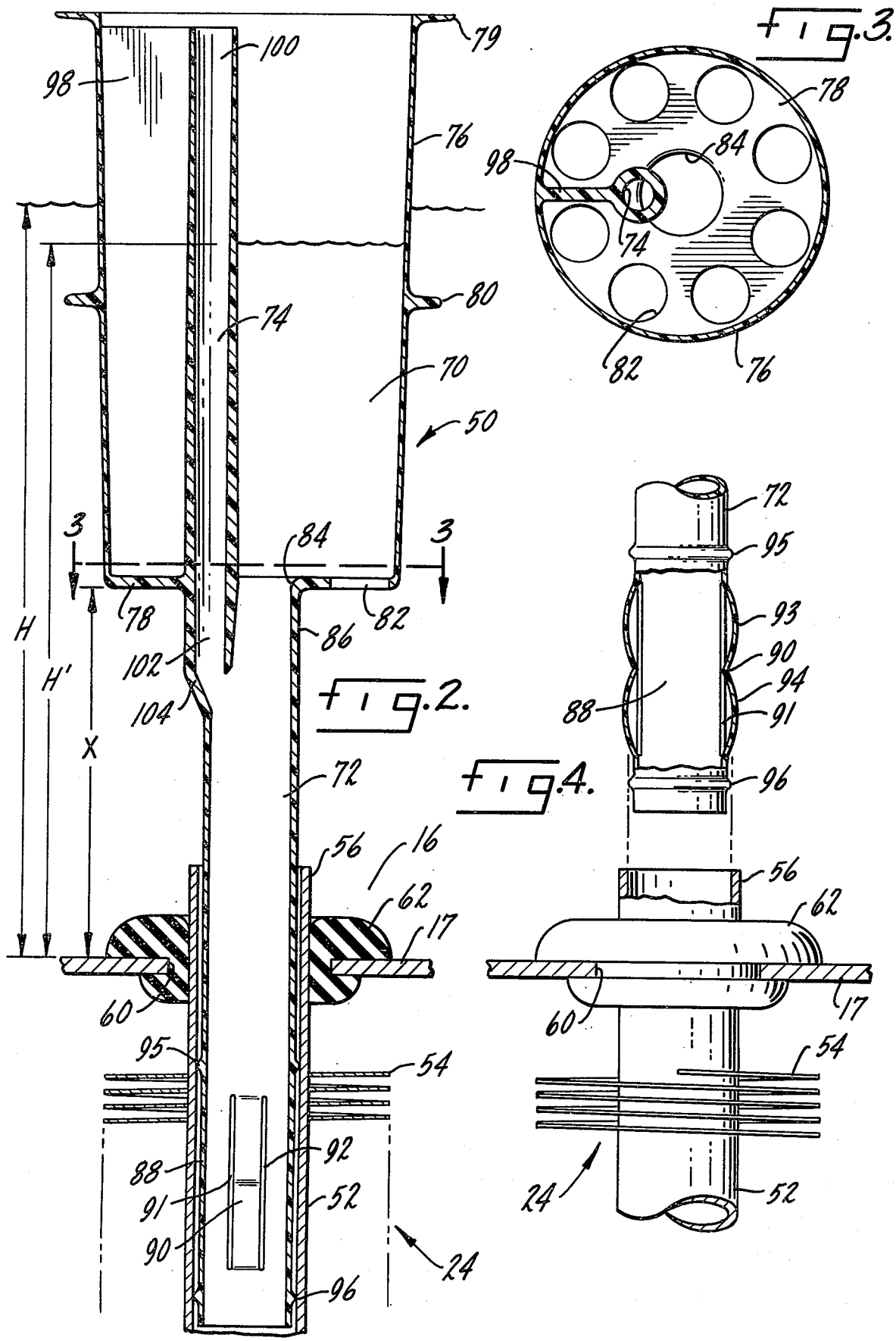

FLOW CONTROL APPARATUS

BACKGROUND OF THE INVENTION

The present invention relates to a flow control nozzle for gravity feed of water to the finned heat exchange tubes of the dry cooling section of a wet/dry cooling tower.

To control or eliminate the formation of fog plume, the cooling tower industry has recently developed various designs of wet/dry cooling towers. These towers include dry air cooled heat exchanger sections and wet evaporative sections, where the water to be cooled is fed downwardly, transversely to the flow of cooling air. The exiting air from the dry and wet sections are mixed and leave the tower through a common exhaust. This serves to reduce the relative humidity of the exhaust air from the wet section and also reduces water evaporation losses. Reference is made to U.S. Patent No. 3,899,553, Patented on Aug. 12, 1975, and assigned to the same assignee as the present invention, for a complete disclosure of a specific wet/dry cooling tower design for which the flow control nozzle of the present invention is adapted for use. The tower includes a wet evaporative cooling section, having a conventional packing area, positioned immediately below a dry section, having a plurality of vertically spaced heat exchange tubes. Water to be cooled flows directly from a water basin through the tubes for preliminary cooling and is then directed over the packing area of the wet section via spray nozzles associated with the lower ends of each tube. The exhaust air from the wet and dry sections is mixed together prior to emission to the atmosphere.

The present invention is directed to a flow control nozzle for controlling the gravity feed of water from the hot water basin to the heat exchange tubes of the dry cooling section. Because of cooling requirements and water loading, the tubes are not designed to run full, rather a thin film of water flows down the inside surface of the tube. The flow control nozzle must allow a relatively small amount of water to flow through the tube, while still allowing a substantial head of water to exist in the hot water basin.

SUMMARY OF THE INVENTION

It is a primary object of the present invention to provide a flow control nozzle to gravity feed water from the hot water basin of a wet/dry tower to the heat exchange tubes of the dry cooling section.

Another object is to provide such a flow control nozzle which serves to allow even water flow to all the heat exchange tubes.

A further object of the present invention is to provide such a flow control nozzle which acts as a filter to prevent debris in the water from plugging the heat exchange tubes.

A still further object is to provide such a flow control nozzle which prevents basin overflow in the unlikely event that many tubes become clogged and the flow to the remaining nozzles exceeds its normal range of flow.

These and other objects are realized in accordance with the present invention by providing a flow control nozzle comprising a tubular portion having a lower end received within the upper end of the tube and an upper end in fluid communication with a chamber portion formed integrally therewith. The chamber portion has an open upper end and a closed lower end having openings formed therein to permit the passage of water from the basin therethrough and into the chamber portion. The elevation of the chamber portion above the basin floor and consequently the height of the water level therein is controlled by adjusting the length of the tubular portion which is received within the tube. An air vent is formed integrally with the chamber portion and the tubular portion so as to include a lower end in communication with the interior of the tubular portion and an upper end extending upward within the chamber portion to a level immediately below the upper edge thereof. Since the amount of water flowing through the nozzle is a function of the level of water in the chamber portion, the water flow through each nozzle can be equalized by adjusting the elevation of the chamber portion so that the level of water in the chamber portions of all the nozzles is the same. The air vent serves to maintain atmospheric pressure inside the tube to prevent the formation of a vortex which would prevent the maintenance of equal flow to all the tubes.

BRIEF DESCRIPTION OF THE DRAWINGS

Other objects and many of the attendant advantages of the invention will be readily appreciated as the same becomes better understood by reference to the following detailed description when considered in connection with the accompanying drawings, in which like reference numerals designate like parts throughout the figures thereof and wherein:

FIG. 2 is a sectional view of the flow control nozzle positioned within a heat exchange tube;

FIG. 3 is a sectional view taken along line 3—3 in FIG. 2; and

FIG. 4 is an elevational view, partially in section, showing the tubular portion of the flow control nozzle immediately prior to its insertion into the heat exchange tube.

DESCRIPTION OF A PREFERRED EMBODIMENT

Figure 1:
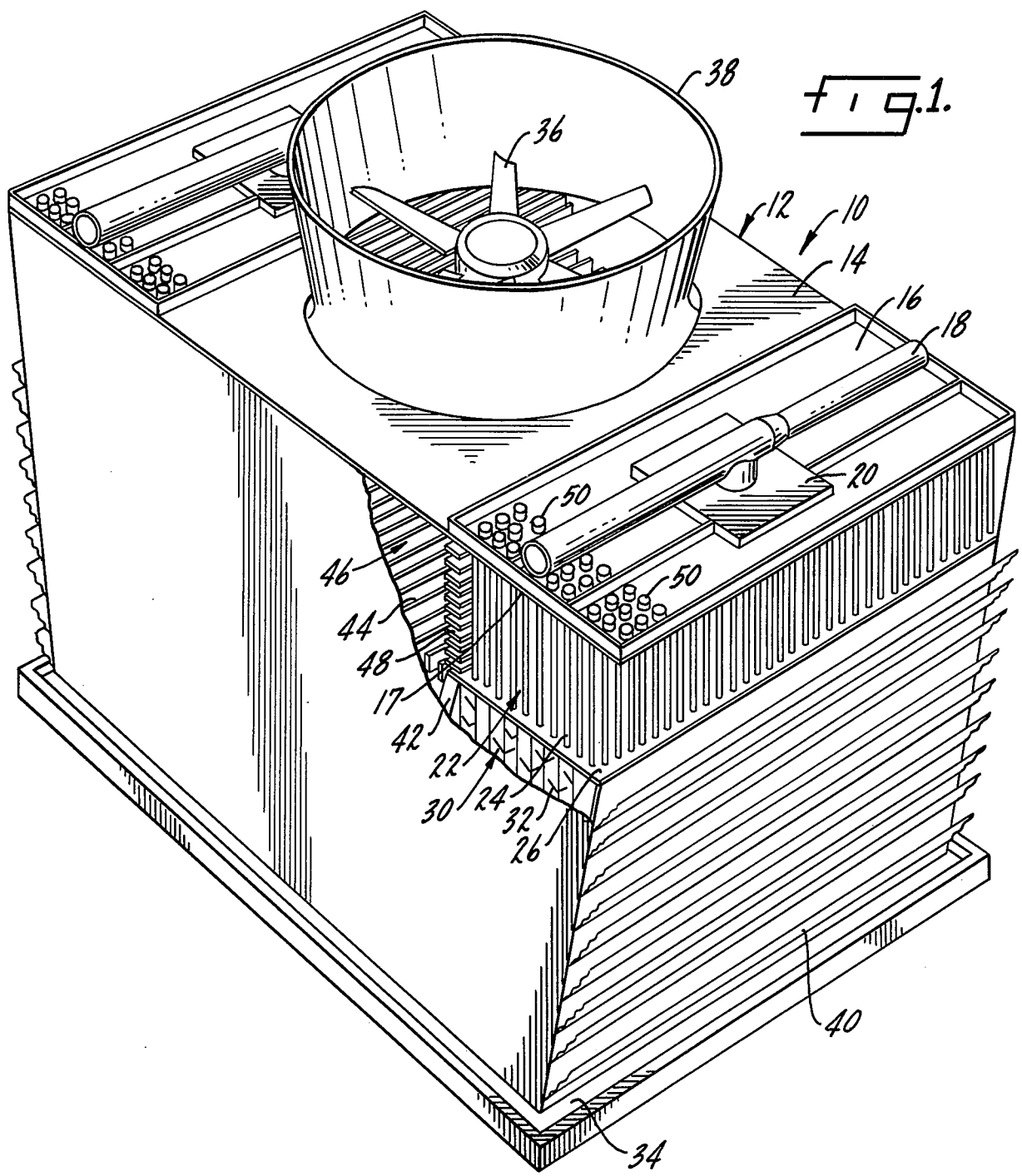
FIG. 1 is a perspective view of a cooling tower incorporating the flow control nozzles of the present invention, partially broken away to show internal details.

Referring to FIG. 1, an exemplary one cell wet/dry cooling tower of the type contemplated for use with the present invention is indicated generally at 10. Tower 10 includes a housing 12 incorporating a top deck 14 defining a hot water distribution basin 16. Liquid, such as water to be cooled, is pumped into basin 16 through distribution pipe 18 and distribution box 20. Positioned immediately below basin 16 is a dry cooling section 22 which includes a plurality of vertically disposed finned heat exchange tubes 24 arranged in a plurality of transversely extending rows and mounted between the floor 17 of basin 16 and a horizontal partition deck 26. Liquid from basin 16 flows downward through tubes 24 serially into a wet cooling section 30 positioned immediately therebelow. After descending through fill or packing 32 of well known configuration, the cooled liquid is collected in a cold water collection basin 34 for removal to service.

A fan 36 rotating in stack 38 draws ambient air laterally through the tower for upward discharge via the stack. The air passes successively through openings between housing side wall inlet louvers 40, which are separately associated with both dry section 22 and wet section 30, and then through the respective dry and wet sections 22 and 30. The air passing through wet section 30 exits therefrom through a conventional drift eliminator assembly 42 and then upwardly through a movable louver or damper assembly 44 into a centrally disposed plenum area 46 immediately below the stack 38. The air passing through dry section 22 exits through a movable louver or damper assembly 48 into plenum area 46. The exhaust air from dry section 22 and wet section 30 are mixed in plenum area 46 prior to discharge from the tower via stack 38 to the atmosphere. Movable louver assemblies 44 and 48 are preferably motor operated to permit selective adjustment thereof to control the ratio of air mix in the plenum area 46 which emanates from the dry and wet sections.

The flow control nozzles or inserts 50 of the present invention, as seen in FIGS. 1 and 2, are provided to evenly distribute water from basin 16 into the heat exchange tubes 24. As best seen in FIG. 2, each finned tube 24 includes a central core 52 around which fins 54 are formed in any well known manner. The upper ends 56 of cores 52 are not finned to permit installation and support of the tubes 24. Upper ends 56 extend through corresponding openings 60 in floor 17 of basin 16. Positioned within each opening 60 is a flexible rubber grommet 62 to retain the tube 24 in place and cause a liquid seal preventing water from the basin 16 from entering the dry section 22.

Referring to FIGS. 2 and 3, the preferred embodiment of the flow control nozzle 50 includes a distribution chamber portion 70, a connecting tubular portion 72, and an air vent tube portion 74, all of which are preferably integrally formed from a plastic material. Chamber portion 70 is defined by a circular side wall 76 and a bottom surface 78. Reinforcing ribs 79 and 80 are integrally formed about side wall 76 to add rigidity to the structure. A plurality of circular openings 82 are formed about the periphery of bottom surface 78. A circular opening 84 of larger diameter than openings 82 is formed through a central portion of bottom surface 78.

Integrally formed with and extending downward from bottom surface 78 is connecting tubular portion 72. Tubular portion 72 has an upper end 86 whose upper edges are integrally formed with bottom surface 78 about the periphery of opening 84. The lower end 88 of tubular portion 72 is adapted to be received and retained within central core 52 of finned tube 24. A pair of spring retainers 90 are formed integral with lower end 88 in a diametrically opposed relationship, as best seen in FIGS. 2 and 4. Spring retainers 90 are defined between slots 91 and 92 in lower end 88 and extent outward therefrom with a pair of humps 93 and 94. A pair of annular beads 95 and 96 are respectively formed integral with and extending outward from lower end 88 immediately above and below spring retainers 90. The outer diameters of beads 95 and 96 are substantially the same as the inner diameter of central core 52 and less than the outer diameter of spring retainers 90 at their humps 93 and 94.

The air vent tube portion 74 is integrally formed with side wall 76 through web portion 98. Vent tube 74 is preferably positioned within chamber portion 70 such that its vertical axis passes through the periphery of opening 84. The upper end 100 of vent tube 74 extends upward to an elevation a short distance below the upper edge of side wall 76. The lower end 102 of vent tube 74 extends downward through bottom surface 78 at opening 84 where it integrally meets tubular portion 72 at a bulge 104 formed in tubular portion 72 immediately below bottom surface 78. The upper end 100 is in communication with the atmosphere, while the lower end 102 is in communication with the interior of tubular portion 72 so as to maintain atmospheric pressure therein.

Flow control nozzle 50 is inserted into the upper end 56 of heat exchange tubes 24. The outer diameter of beads 95 and 96 contact and form a liquid seal against the inner surface of upper end 56. The spring retainers 90 are deflected inward as they enter upper end 56 so as to exert a retaining force against the inner surface thereof. This retaining force is sufficient to retain the nozzle 50 in a fixed position, while still permitting it to be vertically adjusted by applying an additional upward or downward force thereto. It should be pointed out that the liquid seal between lower end 88 of tubular portion 72 and upper end 56 of tube 24 may alternatively be attained by sizing lower end 88 to contact the inner surface of upper end 56 and thereby eliminating the need for beads 95 and 96.

In operation, hot water, which, for example, may be derived from a condenser forming a part of a power plant or the like, is directed through distribution pipe 18 and distribution box 20 into hot water distribution basin 16. The water in basin 16 eventually reaches an equilibrium height H in the basin 16. The flow control nozzles 50 are positioned within the respective heat exchange tubes 24 such that the upper edges of chamber portions 70 are above the water level in basin 16 and the bottom surfaces 78 are below the water level in basin 16. The water from basin 16 enters the chamber portions 70 through openings 82 in bottom surfaces 78 and reaches a corresponding height therein indicated at H in FIG. 2. As can be seen, the water level in chamber portions 70 H is somewhat lower than the water level in basin 16 H which is due to friction and turning losses. The water in chamber portions 70 is free to gravitate down tubular portions 72 into the corresponding heat exchange tubes 24.

The amount of water flowing through each nozzle 50 is a function of the working head H. By operating in this manner, the water flow rate through each nozzle 50 can be made equal by adjusting the distance the bottom surface 78 extends above the basin floor 17, indicated at X, so that H is the same for all the nozzles in the basin. For example, due to the hydraulic gradient in the basin, the water level H is usually slightly higher nearer the distribution box 20 than at areas further removed from the box. Thus X can be made larger for the nozzles 50 near the distribution box 20 so that the net effect is an equal H for all the nozzles 50, and hence equal water flow. The vertical adjustment of bottom surface 78 relative to basin floor 17, and consequently the change of the distance X, is effected by moving tubular portion 72 up and down within core 52 of tube 24 was alluded to hereinabove.

The water entering the chamber portion 70 is from an elevation between the basin floor 17 and the water surface which reduces the chance of picking up debris that will clog the nozzle. Particles such as boiler scale that sink to the bottom will not interfere because of the distance X from the floor to the openings 82 in bottom surface 78. By the same token, floating debris present within the basin 16 will not clog the nozzle because of the submerged water entrance openings 82. The diameter of openings 82 is sized smaller than the diameter of opening 84 which feeds tubular portion 72 so that any submerged debris which is able to enter chamber portion 70 through openings 82 will also be able to flow through tubular portion 72 without impeding water delivery therethrough.

The air vent tube 74 maintains atmospheric pressure inside the tubular portion 72. If the air vent tube 74 was not present or blocked off, the pressure in the tubular portion 72 would drop, a vortex would form, and the water level within chamber portion 70 would drop to a level such that H' would be less than ¼ inch. This would result in noisy operation as well as making it impossible to maintain equal flow to all the tubes 24. This is because the same small H' could result in almost any flow rate; the vortex that would form would merely be pronounced at higher flow rates. In the unlikely event that a nozzle 50 is forced to deliver more than its normal maximum flow rate, the basin 16 would not overflow because the air vent tube 74 would be shut off by the rising water level. As the air vent tube 74 is shut off, pressure in the tubular portion 72 goes below atmospheric and water is drawn down through the tubular portion 72 at a faster rate. Hence, the water level drops slightly and the air vent tube 74 is cleared. The net effect is that the water level oscillates just above and just below the upper end 100 of air vent tube 74. This phenomenum has been observed with flow rates exceeding twice the normal maximum flow.

The flow control nozzle 50 of the present invention is contemplated for use in environments other than in combination with a wet/dry cooling tower. For example, similar type nozzles may be used in communication with conventional spray nozzles to evenly distribute water from the hot water basin of a wet cooling tower over the fill area. It should, therefore, be understood that the foregoing disclosure relates to only a preferred embodiment of the invention and that numerous modifications or alterations may be made therein without departing from the spirit and the scope of the invention as set forth in the appended claims.

What is claimed is:

1. A flow control nozzle for directing a liquid through the floor of a liquid containing basin; comprising:
   a. a substantially vertical tubular portion having a lower end adapted to extend through the floor of said basin;
   b. a chamber portion having a bottom surface in communication with an upper end of said tubular portion below the liquid level in said basin, said bottom surface having openings formed therethrough and being positioned a predetermined distance above the floor of said basin so as to permit liquid to pass therethrough into said chamber portion; and
   c. an air vent tube having an upper end extending upwardly into said chamber portion and in communication with the atmosphere and a lower end in communication with said tubular portion.

2. The invention as defined in claim 1 wherein said lower end of said tubular portion extends through said basin floor in a manner which permits vertical adjustment of said chamber portion relative to said basin floor.

3. The invention as defined in claim 1 wherein said air vent tube extends upwardly into said chamber portion.

4. The invention as defined in claim 3 wherein the upper end of said air vent tube extends upwardly into said chamber portion to an elevation above the level of liquid therein and below the upper edge thereof.

5. The invention as defined in claim 1 wherein said tubular portion, said chamber portion, and said air vent tube are all integrally formed from a plastic material.

6. The invention as defined in claim 1 wherein said openings in said lower end of said chamber portion are sized such that matter which passes therethrough will be able to pass through said tubular portion.

* * * * *

UNITED STATES PATENT AND TRADEMARK OFFICE
CERTIFICATE OF CORRECTION

PATENT NO. : 3,977,431
DATED : August 31, 1976
INVENTOR(S) : John C. Ovard, etal It is certified that error appears in the above-identified patent and that said Letters Patent are hereby corrected as shown below:

In column 4, line 33 delete "H" and insert ---H'---

In column 4, line 34 delete "H" and insert ---H'---

In column 4, line 40 delete "H" and insert ---H'---

In column 4, line 44 delete "H" and insert ---H'---

In column 4, line 50 delete "H" and insert ---H'---

In column 4, line 55 delete "was" and insert ---as---

Signed and Sealed this

Twenty-sixth Day of October 1976

[SEAL]

Attest:

RUTH C. MASON
Attesting Officer

C. MARSHALL DANN
Commissioner of Patents and Trademarks